United States Patent
Steadman Booker et al.

(10) Patent No.: US 11,131,780 B2
(45) Date of Patent: Sep. 28, 2021

(54) DIRECT CONVERSION RADIATION DETECTION

(71) Applicant: KONINKLIJKE PHILIPS N.V., Eindhoven (NL)

(72) Inventors: Roger Steadman Booker, Aachen (DE); Christoph Herrmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 3 days.

(21) Appl. No.: 16/623,462

(22) PCT Filed: Jun. 21, 2018

(86) PCT No.: PCT/EP2018/066671
§ 371 (c)(1),
(2) Date: Dec. 17, 2019

(87) PCT Pub. No.: WO2019/002103
PCT Pub. Date: Jan. 3, 2019

(65) Prior Publication Data
US 2020/0183023 A1 Jun. 11, 2020

(30) Foreign Application Priority Data
Jun. 28, 2017 (EP) ...................... 17178401

(51) Int. Cl.
*G01T 1/24* (2006.01)
(52) U.S. Cl.
CPC ...................... *G01T 1/24* (2013.01)
(58) Field of Classification Search
CPC ...................... G01T 1/24
See application file for complete search history.

(56) References Cited

U.S. PATENT DOCUMENTS

| 7,223,981 B1 | 5/2007 | Capote |
| 8,824,635 B2 | 9/2014 | Tkaczyk |

(Continued)

FOREIGN PATENT DOCUMENTS

| DE | 102014217904 A1 | 3/2016 |
| EP | 1394567 A2 | 3/2004 |

(Continued)

OTHER PUBLICATIONS

PCT International Search Report, International application No. PCT/EP2018/066671, Aug. 21, 2018.

*Primary Examiner* — Hugh Maupin
(74) *Attorney, Agent, or Firm* — Larry Liberchuk

(57) ABSTRACT

The invention relates to a radiation detector (1), an imaging system and a related method for radiation detection. The detector comprises a direct conversion material (2) for converting x-ray and/or gamma radiation into electron-hole pairs by direct photon-matter interaction. The detector comprises an anode (3) and a cathode (4) arranged on opposite sides of the direct conversion material (2) such that the electrons and holes can respectively be collected by the anode and cathode. The cathode is substantially transparent to infrared radiation. The detector comprises a light guide layer (5) on the cathode at a side of the cathode that is opposite of the direct conversion material, in which the light guide layer is adapted for distributing infrared radiation over the direct conversion material. The detector comprises a reflector layer (6) arranged on the light guide layer (5) at a side opposite of the cathode, in which the reflector layer is adapted for substantially reflecting infrared radiation. The detector comprises at least one light emitter (7), abutting on and/or integrated in the light guide layer (5), for emitting infrared radiation into the light guide layer.

14 Claims, 2 Drawing Sheets

(56) References Cited

U.S. PATENT DOCUMENTS

| | | |
|---|---|---|
| 9,664,558 B2 | 5/2017 | Herrmann |
| 2008/0016441 A1 | 7/2008 | Shahar |
| 2008/0164418 A1 | 7/2008 | Shahar |
| 2010/0051816 A1 | 3/2010 | Snoeren |
| 2015/0221406 A1* | 8/2015 | Dierre ........................ G01T 1/24 378/19 |
| 2015/0362604 A1 | 12/2015 | Verbakel |

FOREIGN PATENT DOCUMENTS

| | | |
|---|---|---|
| WO | WO2004095067 A1 | 11/2004 |
| WO | WO2014072939 A1 | 5/2014 |

\* cited by examiner

DIRECT CONVERSION RADIATION DETECTION

FIELD OF THE INVENTION

The invention relates to the field of radiation detection, and particularly to detection of gamma and X-ray photons by direct conversion of incident radiation into electrical signals. More specifically it relates to a radiation detector and a method for detecting radiation.

BACKGROUND OF THE INVENTION

It is known in the art to use semiconductor materials, such as group II-VI binary or ternary compound materials, e.g.; CdZnTe (CZT) and CdTe, as direct conversion materials in photon detection. It is an advantage of such materials that these may have a good stopping power for photons in the X-ray and gamma photon spectral ranges, and furthermore may provide a good transient response speed for direct conversion of the incident radiation into electrical signals. CdMnTe, InP, $TlBr_2$ or $HGI_2$ are other examples of materials that may be suitable for X-ray and/or gamma detection due to a high absorption in the appropriate energy range.

Semiconductor alloys such as CZT and/or CdTe may furthermore be suitable for radiation detectors that operate at room temperature and that can process a high photon flux, e.g. more than one million photons per second per square millimeter.

These direct conversion materials may therefore be particularly suitable for energy-resolved photon counting, e.g. in clinical applications such as spectral CT and/or nuclear medicine. Direct converting materials such as CdTe and CdZnTe may be particularly suitable for use in photon-counting energy-resolved spectral computed tomography (PCS-CT) detectors.

In a detector element based on such semiconductor material, absorption of an X-ray or gamma photon is detected by a pair of electrodes arranged on either side of the semiconductor material layer. A voltage can be applied to the electrodes to generate an electric field over the semiconductor material, e.g. such that one electrode acts as cathode and the other as anode. In an imaging array, one of the electrodes may be shared over a plurality of separate detection elements, e.g. acting as a counter-electrode, while each detector element in the array may have a dedicated read-out electrode for spatially resolved detection of absorption events.

However, direct conversion materials, such as CZT and CdTe, may be sensitive to charge trapping, e.g. which cause polarization, e.g. causing changes of the electric field when exposed to a photon flux. For example, in an electric field generated between an electrode pair in a detector, charges liberated by an absorption event can be driven toward one of the electrodes by a voltage difference applied over the electrode pair. This may generate a detectable electrical signal, e.g. in the form of a current, the magnitude of which is proportional to the area integral of the current curve and thus proportional to that quantity of charge which is liberated by an incident photon. The evaluation signal thus generated may be provided to a pulse discriminator, which, in a threshold-value-based manner, can detect the photon.

However, if a space-charge is formed by charge trapping in the detector volume, e.g. inside a pixel volume, the applied electrical field may be relatively weakened by this charge, such that electron-hole pairs generated by photon-matter interactions drift more slowly to the collecting anode/cathode pair.

It is known in the art to mitigate the effects of charge trapping in CZT or CdTe, e.g. of changes in polarization and/or electric field changes. For example, in WO 2014/072939, it is disclosed that sub-band infrared irradiation of the directly converting semiconductor material may considerably reduce polarization, e.g. such that counting can be achieved at higher tube currents without any baseline shift. This international patent application furthermore discloses an infrared irradiation device integrated into the readout circuit to which the semiconductor crystal is flip-chip bonded in order to enable abutment of semiconductor crystals at four sides.

The semiconductor material can thus be irradiated, in accordance with methods known in the art, with light comprising a wavelength corresponding to an energy above the bandgap of the material, e.g. 1.4 eV for CZT. This irradiation by typically infrared radiation can assist in a significant reduction of imaging and energy resolution artefacts that can be caused by changing electric field conditions, as has been experimentally verified.

SUMMARY OF THE INVENTION

It is an object of embodiments of the present invention to provide good and efficient radiation detection by a detector based on a direct conversion material.

The above objective is accomplished by a method and device according to the present invention.

It is an advantage of embodiments of the present invention that infrared illumination can be easily and efficiently integrated in a radiation detector to prevent or reduce charge trapping and/or polarization of the direct conversion material.

It is an advantage of embodiments of the present invention that a good infrared illumination, e.g. a substantially homogeneous infrared illumination, of the direct conversion material can be achieved.

It is an advantage of embodiments of the present invention that infrared illumination means can be provided in a direct conversion radiation detector suitable for use in a clinical environment, e.g. for diagnostic imaging, e.g. such as to mitigate imaging artefacts.

It is an advantage of embodiments of the present invention that high count rates, e.g. at high x-ray fluxes, can be achieved in a photon counting radiation detector for diagnostic imaging.

In a first aspect, the present invention relates to a radiation detector comprising a direct conversion material for converting x-ray and/or gamma radiation into electron-hole pairs by direct photon-matter interaction of this radiation in the direct conversion material. The detector comprises an anode and a cathode arranged on opposite sides of the direct conversion material such that electrons and holes of the electron-hole pairs can respectively be collected by the anode and the cathode when a voltage is applied over the anode and the cathode. The cathode is furthermore substantially transparent, e.g. transparent, to infrared radiation. The radiation detector also comprises a light guide layer on the cathode at a side of the cathode that is opposite of the direct conversion material, in which the light guide layer is adapted for distributing infrared radiation over the direct conversion material. The detector also comprises a reflector layer arranged on the light guide layer at a side of the waveguide layer that is opposite of the cathode, in which this reflector layer is adapted for (substantially) reflecting the infrared radiation. The detector also comprises at least one light emitter abutting on and/or integrated in the light guide layer, in which the at least one light emitter is adapted for emitting the infrared radiation into the light guide layer.

In a radiation detector in accordance with embodiments of the present invention, the direct conversion material may comprise a cadmium zinc telluride (CdZnTe or CZT) crystal and/or a cadmium telluride crystal.

In a radiation detector in accordance with embodiments of the present invention, the cathode may continuously cover a side of the direct conversion material and the anode may continuously cover another side of the direct conversion material.

In a radiation detector in accordance with embodiments of the present invention, the cathode may continuously cover a first side of the direct conversion material and the detector may comprise a plurality of anodes arranged in a pixelated grid over a second side, opposite of the first side, of the direct conversion material, such that the electrons generated by interaction of radiation with the direct conversion material can be collected in a spatially resolved manner. Particularly, the detector may be an imaging detector.

In a radiation detector in accordance with embodiments of the present invention, the cathode may comprise indium tin oxide (ITO).

In a radiation detector in accordance with embodiments of the present invention, the light guide layer may be transparent to infrared radiation and adapted for diffusing infrared radiation.

In a radiation detector in accordance with embodiments of the present invention, the reflector layer may comprise a metal foil layer, such as an aluminium foil. In a radiation detector in accordance with embodiments of the present invention, the at least one light emitter may comprise a light emitting diode for emitting light in at least part of the wavelength range of 700 nm to 1600 nm, e.g. In the range of 800 nm to 1200 nm.

A radiation detector in accordance with embodiments of the present invention may furthermore comprise readout electronics for detecting, counting and/or analyzing the electron-hole pairs by processing an electrical signal obtained from the anode. Such readout electronics may comprise, for example, a shaper, a counter, a threshold comparator and/or a baseline restorer.

In a radiation detector in accordance with embodiments of the present invention, the at least one light emitter may be electrically connected to the cathode to receive a power supply current for powering the light emitter.

In a radiation detector in accordance with embodiments of the present invention, the at least one light emitter may be connected to an electrode, such that an electrical current, e.g. the power supply current, between the cathode and the electrode can power the at least one light emitter.

In a radiation detector in accordance with embodiments of the present invention, the reflector layer may be electrically conducting and electrically connected to the at least one light emitter such as to act as the electrode for powering the at least one light emitter.

In a radiation detector in accordance with embodiments of the present invention, the at least one light emitter may be electrically connected to the electrically conducting reflector layer, such that an electrical current between the cathode and the electrically conducting reflector layer can power the at least one light emitter.

A radiation detector in accordance with embodiments of the present invention may comprise a power supply for supplying a first voltage, e.g. a high voltage, e.g. 'high voltage' as understood by the skilled person in the context of voltages for generating a suitable electric field over a direct conversion material to enable radiation detection, over the anode and the cathode, and for supplying a second voltage, e.g. a bias voltage, e.g. 'bias voltage' as understood by the skilled person in the context of voltages for generating light emission by a light emitter such as a light emitter diode, over the cathode and the reflector layer.

In a radiation detector in accordance with embodiments of the present invention, the at least one light emitter may abut on the light guide layer, such that the at least one light emitter is arranged laterally on one or more sides of the light guide layer.

In a radiation detector in accordance with embodiments of the present invention, the at least one light emitter may comprise an array of light emitters that are embedded, e.g. integrated and embedded, in the light guide layer.

In a second aspect, the present invention relates to a diagnostic imaging system comprising a radiation detector in accordance with embodiments of the first aspect of the present invention.

In a third aspect, the present invention relates to a method for detecting radiation, the method comprising:

obtaining a direct conversion material for converting x-ray and/or gamma radiation into electron-hole pairs by direct photon-matter interaction of said radiation in said direct conversion material, an anode and a cathode being arranged on opposite sides of said direct conversion material, wherein said cathode is substantially transparent to infrared radiation;

applying a first voltage over said anode and said cathode such that electrons and holes of said electron-hole pairs can respectively be collected by said anode and said cathode;

emitting infrared radiation into a light guide layer for distributing infrared radiation over said direct conversion material, said light guide layer being provided on the cathode at a side of the cathode that is opposite of said direct conversion material; and reflecting infrared light using a reflector layer arranged on said light guide layer at a side of said light guide layer that is opposite of said cathode.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
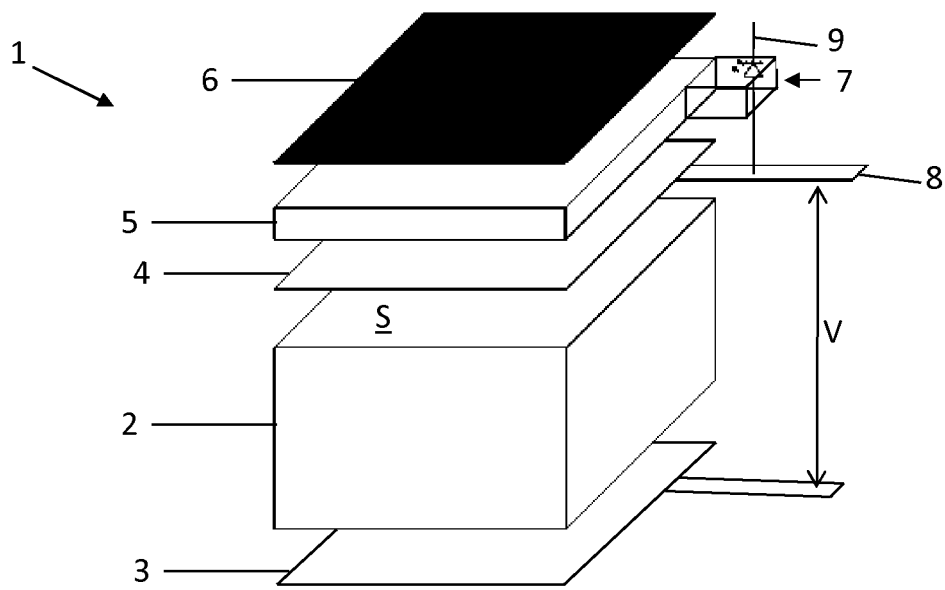
FIG. 1 illustrates a first exemplary detector in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a radiation detector comprising a direct conversion material for converting x-ray and/or gamma radiation into electron-hole pairs by direct photon-matter interaction of said radiation in the direct conversion material, an anode and a cathode arranged on opposite sides of the direct conversion material such that electrons and holes of the electron-hole pairs can respectively be collected by the anode and the cathode when a voltage is applied over the anode and the cathode. The cathode is furthermore transparent to infrared radiation. The radiation detector also comprises a light guide layer on the cathode at a side of the cathode that is opposite of the direct conversion material, in which the light guide layer is adapted for distributing infrared radiation over the direct conversion material. The detector also comprises a reflector layer arranged on the light guide layer at a side of the waveguide layer that is opposite of the cathode, in which this reflector layer is adapted for reflecting the infrared radiation. The detector also comprises at least one light emitter abutting on and/or integrated in the light guide layer, in which the at least one light emitter is adapted for emitting the infrared radiation into the light guide layer. FIG. 1 shows schematically an exemplary detector 1 in accordance with embodiments of the present invention. For the sake of clarity, layers of the detector 1 may be shown spaced apart, e.g. in an 'exploded' view, in FIG. 1 and FIG. 2, whereas it will be understood by the skilled person that in an embodiment of the present invention, direct physical contact between these layers may be highly preferred.

The radiation detector 1 comprising a direct conversion material 2 for converting x-ray and/or gamma radiation into electron-hole pairs by direct photon-matter interaction of said radiation in the direct conversion material.

For example, the direct conversion material 2 may comprise a direct conversion crystal, e.g. a semiconductor crystal, e.g. a crystal of a binary or ternary group II-IV compound semiconductor, e.g. a CZT crystal or CdTe crystal.

The radiation detector comprises an anode 3 and a cathode 4. The anode and the cathode are arranged on opposite sides of the direct conversion material 2 such that electrons and holes of electron-hole pairs formed in the direct conversion material due to radiation exposure can respectively be collected by the anode 3 and the cathode 4 when a voltage V, e.g. a high voltage is applied over the anode and cathode. For example, the anode and the cathode may be configured such as to allow the generation and collection of electron-hole pairs due to radiation exposure of the direct conversion material when a voltage V is applied over the direct conversion material, e.g. such that the electric field strength in the direct conversion material, e.g. the voltage divided by the thickness of the direct conversion material, is in the range of 100 V/cm to 20 kV/cm, e.g. in the range of 500 V/cm to 10 kV/cm, e.g. in the range of 1 kV/cm to 5 kV/cm.

The cathode 4 may continuously cover a side of the direct conversion material 2. The cathode 4 is furthermore transparent to infrared radiation. For example, the cathode may be composed of a material having a total transmittance higher than 50%, e.g. higher than 60%, e.g. at least 75%, e.g. at least 80%, for light in at least a part of the 700 nm to 1600 nm wavelength range, e.g. in at least a part of the 800 nm to 1200 nm range, e.g. at least for infrared light corresponding to an emission spectrum of the at least one light emitter. Particularly, the cathode 4 may consist of a material that is electrically conducting and substantially transparent to infrared radiation, e.g. an indium tin oxide (ITO) material.

The anode 3 may continuously cover another side of the direct conversion material, i.e. the side of the direct conversion material 2 that is opposite to the side at which the cathode 4 is provided. Alternatively, the detector 1 may comprise a plurality of anodes 3 arranged in a pixelated grid over this other side of the direct conversion material, such that the electrons generated by interaction of radiation with the direct conversion material can be collected in a spatially resolved manner.

The radiation detector 1 also comprises a light guide layer 5 on the cathode 4 at a side of the cathode that is opposite of the direct conversion material 2. The light guide layer 5 is adapted for distributing infrared radiation over the direct conversion material 2. For example, the light guide layer 5 may comprise a light guiding element for guiding the infrared radiation such that the direct conversion material is substantially homogenously illuminated through the cathode 4 by the infrared radiation. For example, the light guide layer 5 may be transparent to the infrared radiation. In a preferred embodiment, the light guide layer 5 may also be adapted for diffusing infrared light. For example, the light guide layer 5 may comprise a frosted plastic material.

The light guide layer 5 may form a light distribution element, e.g. a light diffusing and/or a diffractive element for diffusing and/or diffracting the infrared radiation before traversing the cathode 4. For example, the light guide layer 5 may comprise a diffractive and/or diffusing plate, from which the infrared radiation can be coupled out substantially homogeneously over the cathode 4, e.g. and thus through the cathode 4 preferably substantially homogeneously distributed over the direct conversion material 2.

The detector also comprises a reflector layer 6 arranged on the light guide layer 5 at a side of the light guide layer 5 that is opposite of the cathode 4, in which this reflector layer 6 is adapted for reflecting the infrared radiation, e.g. the reflector layer 6 may be composed of a material forming an interface with the light guide layer 5 that has a reflectance higher than 50%, e.g. higher than 60%, e.g. at least 75%, e.g. at least 80%, for light in at least a part of the 700 nm to 1600 nm wavelength range, e.g. in at least a part of the 800 nm to 1200 nm range, e.g. at least for infrared light corresponding to an emission spectrum of the at least one light emitter. For example, the reflector layer may comprise a metal foil layer, such as an aluminium foil. The reflector layer 6, e.g. an infrared reflecting layer, may advantageously confine as much infrared light as possible within the detector, e.g. within the direct conversion material 2.

Figure 2:
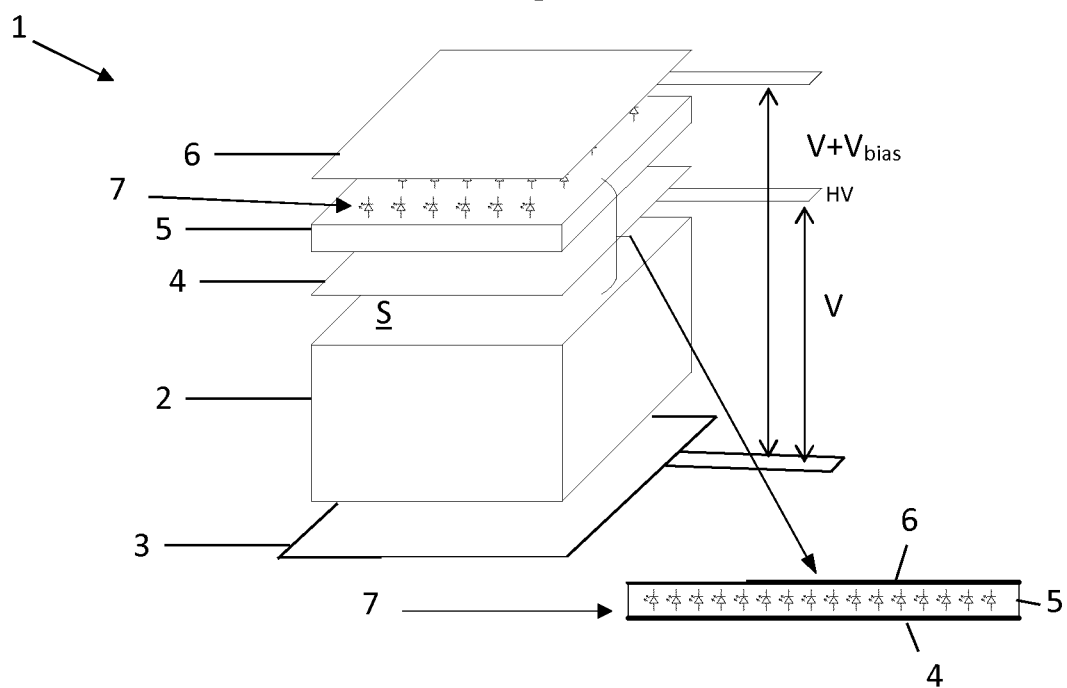
FIG. 2 illustrates a second exemplary detector in accordance with embodiments of the present invention.

The reflector layer may furthermore be electrically conducting. For example, the reflector layer 6 may act as an electrode for powering the at least one light emitter 7, e.g. as illustrated in FIG. 2.

The detector also comprises at least one light emitter 7 abutting on and/or integrated in the light guide layer 5, in which the at least one light emitter is adapted for emitting the infrared radiation into the light guide layer 5. For example, the at least one light emitter may comprise a light emitting diode, e.g. for emitting light in the wavelength range of 700 nm to 1600 nm, e.g. in at least part of the range of 800 nm to 1200 nm.

Changes of the electric field within the direct conversion material, e.g. in the CZT bulk, can be caused by a build-up of space-charge regions, e.g. due to charge trapping.

Furthermore, the detector may comprise readout electronics, e.g. readout electronics capable of high rate detector readout.

A detector in accordance with embodiments of the present invention may be particularly suitable for use in a clinical environment, e.g. in a diagnostic imaging system. The at least one light emitter 7 can be advantageously integrated on the detector without reducing the usable area on an application specific integrated circuit (ASIC) for readout of the detector. For example, while infrared light emitters could be integrated on the readout ASIC to illuminate the direct conversion material from the anode side, this would significantly affect the cost of the ASIC circuit and reduce the usable area for the front-end electronics.

For example, the anode may be integrated on or co-integrated with a readout circuit, e.g. in an ASIC, e.g. with the readout electronics.

In a detector in accordance with embodiments of the present invention, the infrared illuminating means are advantageously integrated at the cathode side of the direct conversion material. Particularly, the cathode may comprise a thin optically transparent (or at least transparent in the relevant IR range) high voltage contact. On top of the cathode, e.g. on top of the transparent contact, the light guide layer 5 may form an IR light guide for distributing the infrared irradiation nearly-uniformly across the whole surface.

The at least one light emitter 7, e.g. at least one LED, may advantageously be connected to the cathode 4, e.g. to a high voltage contact 8 of the cathode 4, to receive a power supply current for powering the light emitter. However, embodiments of the present invention are not necessarily limited thereto, e.g. the at least one light emitter 7 may receive power via a pair of electrodes, e.g. which are separate from, e.g. isolated from, the cathode 4.

The at least one light emitter 7 may be connected to the cathode 4 and a further electrode 9, such that an electrical current between the cathode 4 and the further electrode 9 can power the at least one light emitter 7.

In preferred embodiments, the at least one light emitter 7 may be connected to the electrically conducting reflector layer 6, such that an electrical current between the cathode 4 and the electrically conducting reflector layer 6 can power the at least one light emitter 7. In other words, the further electrode 9 may be, or may comprise, the electrically conducting reflector layer 6. However, embodiments of the present invention are not necessarily limited thereto, e.g. the further electrode 9 may also be separate from, e.g. isolated from, the reflector layer 6.

For example, the detector may comprise a power supply for supplying a voltage to the anode and the cathode such as to obtain a predetermined electric potential difference V between the anode and the cathode, and for supplying a voltage to the reflector layer 6 such as to obtain a predetermined electric potential difference $V+V_{bias}$ between the anode and the reflector layer, where V may refer to a suitable high voltage for generating an appropriate electric field in the direct conversion material for radiation detection purposes, and $V_{bias}$ may refer to a bias voltage of the light emitters, e.g. of the LEDs. It shall be understood by the skilled person that this potential $V_{bias}$ may have a numerically negative value or a numerically positive value, depending on the cathode/anode orientation of the LED within the substrate.

Thus, a detector in accordance with embodiments of the present invention may advantageously only require one additional electrical connection when compared to a conventional detector stack without provisions for infrared illumination.

As shown in FIG. 1, the at least one light emitter 7, e.g. at least one infrared light emitting diode (LED), may abut on the light guide layer 5. For example, the direct conversion material 2 may comprise an incidence surface S, through which the x-ray and/or gamma radiation to be detected can enter the direct conversion material 2. The light emitter may advantageously be arranged laterally from the incidence surface S such that the light emitter doesn't obscure potential trajectories of incident radiation to be detected. The at least one light emitter 7 may thus be placed on one or more sides of the light guide layer 5.

FIG. 2 illustrates a further exemplary radiation detector 1 in accordance with embodiments of the present invention. The at least one light emitter 7 may be integrated in the light guide layer 5. This advantageously allows detectors in accordance with embodiments of the present invention to abut on each other without requiring a gap therein between for accommodating the at least one light emitter 7. For example, the at least one light emitter 7, e.g. a plurality of infrared light emitting diodes, may be embedded in the light guide layer 5, e.g. in a substrate that is transparent to infrared light, e.g. an infrared transparent substrate that is adapted for diffusing infrared light. For example, the at least one light emitter 7 may comprise an array of light emitters, e.g. LEDs, across the whole substrate. The number of light emitters and the pitch of the array may be predetermined such that a uniform distribution of the infrared light over the light guide layer 5, and hence over (at least the surface S of) the direct conversion material 2, can be obtained.

In a second aspect, embodiments of the present invention also relate to a diagnostic imaging system comprising a radiation detector in accordance with embodiments of the first aspect of the present invention, as described hereinabove.

For example, the diagnostic imaging system 100 may be a computed tomography system, e.g. a spectral computed tomography system.

Figure 3:
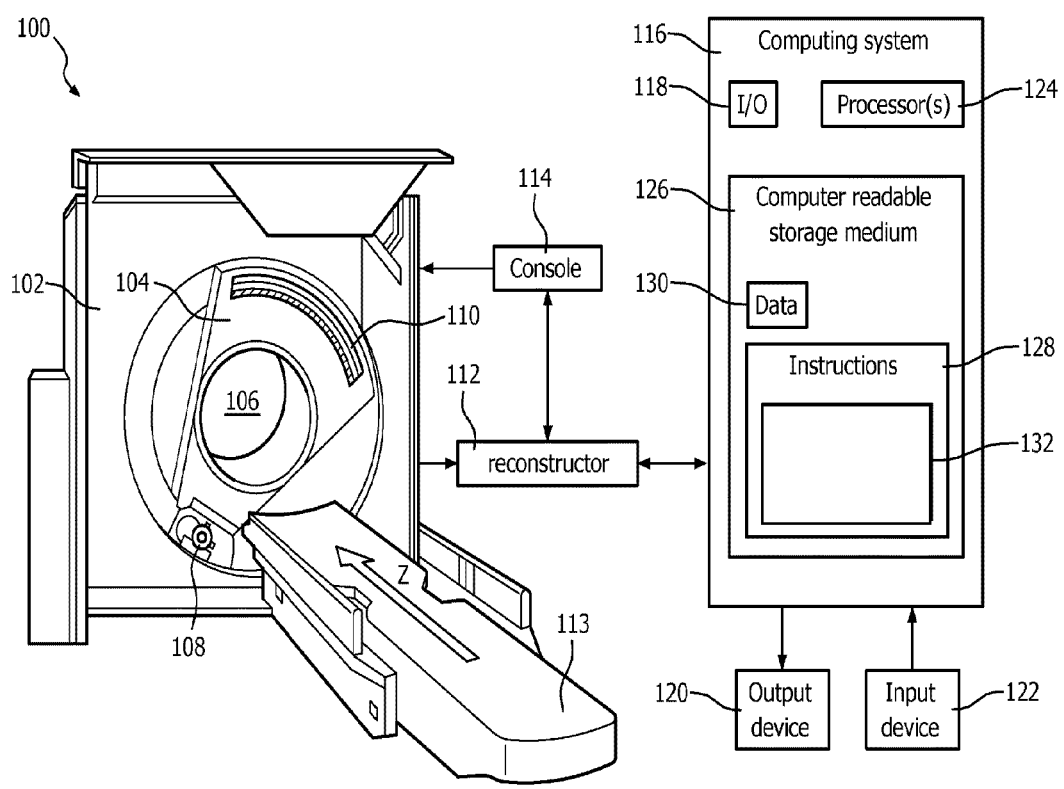
FIG. 3 illustrates an imaging system in accordance with embodiments of the present invention.

FIG. 3 illustrates an imaging system 100 comprising a spectral computed tomography (Spectral CT) scanner. The imaging system 100 may comprise a generally stationary gantry 102 and a rotating gantry 104. The rotating gantry 104 may be rotatably supported by the stationary gantry 102 and may rotate around an examination region 106 about a longitudinal axis Z.

A radiation source 108, such as an x-ray tube, may be rotatably supported by the rotating gantry 104, e.g. such as to rotate with this rotating gantry 104, and may be adapted for emitting poly-energetic radiation that traverses the examination region 106. The radiation source 108 may comprise, or consist of, a single broad spectrum x-ray tube. Alternatively, the radiation source may be adapted for controllably switching between at least two different photon emission spectra, e.g. switching between at least two different peak emission voltages, such as 80 kVp, 140 kVp, etc., during scanning In another variation, the radiation source 108 may comprise two or more x-ray tubes configured to emit radiation with different mean spectrums. In another variation, the radiation source 108 may comprise a combination of the above.

A radiation sensitive detector array 110 may subtend an angular arc opposite the radiation source 108 across the examination region 106. The array 110 may include one or more rows of detectors 1 in accordance with embodiments of the first aspect of the present invention, arranged with respect to each other along the Z-axis direction. The array 110 may be adapted for detecting radiation traversing the examination region 106, and generating signals indicative thereof. The radiation sensitive detector array 110 comprises a direct conversion detector in accordance with embodiments of the first aspect of the present invention, such as a CdTe, CdZnTe or other direct conversion detector.

The system may comprise a reconstructor 112 for reconstructing the signals output by the detector array 110. This may include decomposing the signal into various energy dependent components. The reconstructor 112 may be adapted for reconstructing the energy dependent components and generating one or more images corresponding to one or more different energies. The reconstructor 112 may also combine the energy dependent components to generate non-spectral image data.

The system may comprise a subject support 113, such as a couch, for supporting an object or subject in the examination region. The system may also comprise an operator console 114, e.g. a general purpose computer programmed for controlling or monitoring the system 100 and/or for providing a user interface for an operator. The console 114 may include a human readable output device such as a monitor or display and an input device such as a keyboard and mouse. Software resident on the console 114 may allow the operator to interact with the scanner 100 via a graphical user interface (GUI) or otherwise. This interaction may include selecting a spectral imaging protocol or a non-spectral imaging protocol, initiating scanning, etc.

The imaging system 100 may be operably connected to a workstation, e.g. computing system 116, such as a computer, that may comprise an input/output (I/O) interface 118 for facilitating communication with the spectral CT scanner. The imaging system 100 may comprise the computing system 116 as a system-level integrated component, or the imaging system 100 may be adapted for communicating with a stand-alone computing system 116, e.g. to transmit image data to the computing system 116.

The computing system 116 may further comprise an output device 120. The output device or output devices may comprise, for example, a display monitor, a film printer, a paper printer and/or an audio output for audio feedback. The computing system may also comprise an input device 122 or input devices, such as a mouse, a keyboard, a touch interface and/or a voice recognition interface. The computing system 116 may also comprise at least one processor 124, such as a central processing unit (CPU), a microprocessor, a dedicated application-specific integrated circuit (ASIC) for processing and/or an appropriately configured programmable hardware processor such as a field-programmable gate array. The computing system may comprise a computer readable storage medium 126, e.g. a non-transitory memory such as a physical digital memory. The computer readable storage medium 126 may store computer readable instructions 128 and data 130. The at least one processor 124 may be adapted for executing the computer readable instructions 128. The at least one processor 126 may also execute computer readable instructions carried by a signal, carrier wave or other transitory medium. Alternatively or additionally, the at least one processor may be physically configured to embody the instructions 128, e.g. entirely or in part, without necessarily requiring memory storage of these instructions, e.g. by configuration of a field-programmable gate array or an ASIC specifically designed to carry out at least a part of the instructions.

The instructions 128 may comprise an image processing algorithm 132 for segmenting, analyzing, registering, quantifying, measuring, filtering and/or performing other typical image processing tasks known in the art of diagnostic image processing.

In a further aspect, embodiments of the present invention also relate to a method for detecting radiation. The method comprises obtaining a direct conversion material for converting x-ray and/or gamma radiation into electron-hole pairs by direct photon-matter interaction of the radiation in the direct conversion material, having an anode and a cathode arranged on opposite sides of the direct conversion material, in which the cathode is substantially transparent to infrared radiation.

The method comprises applying a first voltage (V), e.g. a suitable high voltage, over the anode and the cathode such that electrons and holes of the electron-hole pairs can respectively be collected by the anode and the cathode.

The method comprises emitting infrared radiation into a light guide layer for distributing infrared radiation over the direct conversion material, in which the light guide layer is provided on the cathode at a side of the cathode that is opposite of the direct conversion material.

The method comprises reflecting the infrared light using a reflector layer arranged on the light guide layer at a side of the light guide layer that is opposite of the cathode.

Details of methods in accordance with embodiments of the present invention shall be clear in relation to the description provided hereinabove relating to embodiments of the first aspect of the present invention. Particularly, functions performed by or operation of the detector in accordance with embodiments of the present invention shall be understood as constituting corresponding steps and/or features of a method in accordance with embodiments of the present invention.

The invention claimed is:

1. A radiation detector, comprising:
    a direct conversion material for converting x-ray and/or gamma radiation into electron-hole pairs by direct photon-matter interaction of said radiation in said direct conversion material;
    an anode and a cathode arranged on opposite sides of said direct conversion material, such that electrons and holes of said electron-hole pairs can respectively be collected by said anode and said cathode when a voltage is applied over said anode and said cathode, wherein said cathode is substantially transparent to infrared radiation;
    a light guide layer on the cathode at a side of the cathode that is opposite of said direct conversion material, wherein said light guide layer is configured to distribute infrared radiation over said direct conversion material;
    a reflector layer arranged on said light guide layer at a side of said light guide layer that is opposite of said cathode, wherein said reflector layer is configured to substantially reflect infrared radiation; and
    at least one light emitter integrated in said light guide layer, wherein said at least one light emitter is configured to emit infrared radiation into the light guide layer.

2. The radiation detector according to claim 1, wherein said reflector layer comprises a metal foil layer.

3. The radiation detector according to claim 1, wherein said at least one light emitter is electrically connected to said cathode to receive a power supply current for powering the at least one light emitter.

4. The radiation detector according to claim 3, wherein said at least one light emitter is connected to an electrode, such that an electrical current between said cathode and said electrode can power said at least one light emitter.

5. The radiation detector according to claim 4, wherein said reflector layer is electrically conducting and electrically connected to said at least one light emitter such as to act as said electrode for powering said at least one light emitter.

6. The radiation detector according to claim 5, comprising a power supply for supplying a first voltage over said anode and said cathode and a second voltage over said cathode and said reflector layer.

7. The radiation detector according to claim 1, wherein said at least one light emitter comprises an array of light emitters that are embedded in the light guide layer.

8. The radiation detector according to claim 1, wherein said direct conversion material comprises a cadmium zinc telluride crystal and/or a cadmium telluride crystal.

9. The radiation detector according to claim 1, wherein said cathode continuously covers a first side of the direct conversion material, and wherein said detector is an imaging detector comprising a plurality of anodes arranged in a pixelated grid over a second side of the direct conversion material opposite to said first side, such that the electrons generated by interaction of radiation with said direct conversion material can be collected in a spatially resolved manner.

10. The radiation detector according to claim 1, wherein said cathode comprises indium tin oxide.

11. The radiation detector according to claim 1, wherein said at least one light emitter comprises a light emitting diode for emitting light in at least part of the wavelength range of 700 nm to 1600 nm.

12. The radiation detector according to claim 1, furthermore comprising readout electronics for detecting, counting and/or analyzing the electron-hole pairs by processing an electrical signal obtained from the anode.

13. A diagnostic imaging system, comprising:
    a radiation source; and
    a radiation detector comprising:
        a direct conversion material for converting x-ray and/or gamma radiation into electron-hole pairs by direct photon-matter interaction of said radiation in said direct conversion material;
        an anode and a cathode arranged on opposite sides of said direct conversion material, such that electrons and holes of said electron-hole pairs can respectively be collected by said anode and said cathode when a voltage is applied over said anode and said cathode wherein said cathode is substantially transparent to infrared radiation;
        a light guide layer on the cathode at a side of the cathode that is opposite of said direct conversion material, wherein said light guide layer is configured to distribute infrared radiation over said direct conversion material;
        a reflector layer arranged on said light guide layer at a side of said light guide layer that is opposite of said cathode, wherein said reflector layer is configured to substantially reflect infrared radiation; and
        at least one light emitter integrated in said light guide layer, wherein said at least one light emitter is configured to emit infrared radiation into the light guide layer.

14. A method for detecting radiation, comprising:
    obtaining a direct conversion material for converting x-ray and/or gamma radiation into electron-hole pairs by direct photon-matter interaction of said radiation in said direct conversion material, wherein an anode and a cathode is arranged on opposite sides of said direct conversion material, wherein said cathode is substantially transparent to infrared radiation;

applying a first voltage over said anode and said cathode such that electrons and holes of said electron-hole pairs can respectively be collected by said anode and said cathode;

emitting from at least one light emitter infrared radiation into a light guide layer for distributing infrared radiation over said direct conversion material, wherein said light guide layer is provided on the cathode at a side of the cathode that is opposite of said direct conversion material, wherein the at least one light is integrated in the light guide layer; and reflecting infrared light using a reflector layer arranged on said light guide layer at a side of said light guide layer that is opposite of said cathode.

\* \* \* \* \*